United States Patent Office 3,453,573
Patented July 1, 1969

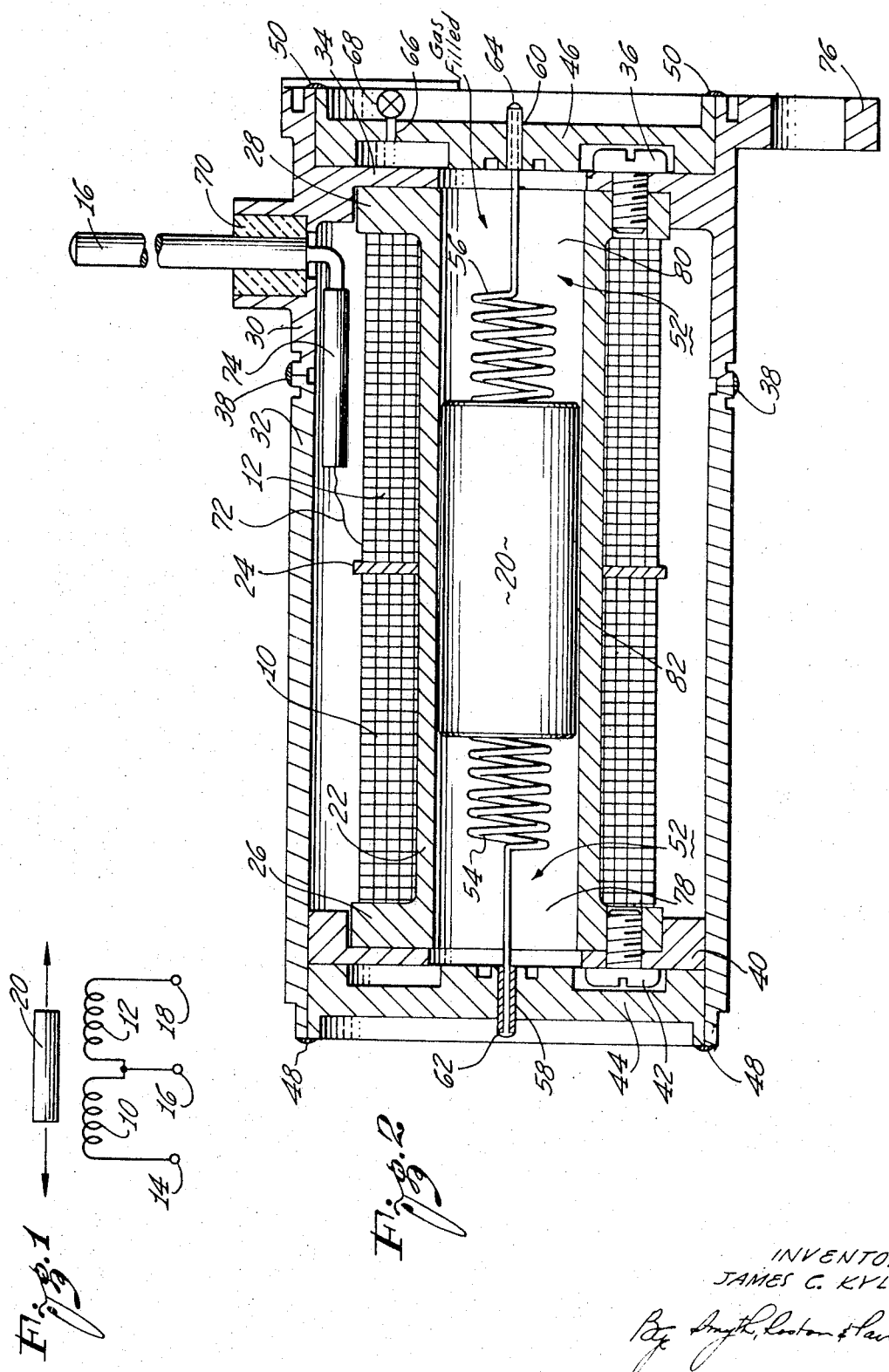

3,453,573
TEMPERATURE COMPENSATED TRANSDUCER
James C. Kyle, Glendora, Calif., assignor to Physical Sciences Corporation, Arcadia, Calif., a corporation of California
Filed Apr. 29, 1966, Ser. No. 546,238
Int. Cl. H01f 21/02; H02k 33/02, 35/02
U.S. Cl. 336—30                    9 Claims

ABSTRACT OF THE DISCLOSURE

This invention relates to a transducer for providing an output signal in response to a relative movement between a magnetic core and an inductive winding. The transducer includes a bobbin which is disposed within a sealed chamber. At least one inductive winding is wound on the bobbin. A magnetic core is disposed within the bobbin and a suspension system is disposed within the central chamber and is coupled to the magnetic core for supporting the magnetic core for movement relative to the bobbin. A gas is disposed within the chamber under pressure and has changes in viscosity with changes in temperature to compensate over a particular range of temperatures for changes in elasticity of the spring suspension system with changes in temperature.

---

This invention relates to a transducer. Specifically, the present invention is directed to a transducer which is temperature compensated over a broad range of temperatures. In particular, the transducer of the present invention is temperature compensated for use from cryogenic to very high temperature conditions.

The principles of temperature compensation of the present invention may be incorporated in different types of transducers such as vibrometers and accelerometers. As an example of the present invention, a vibrometer is disclosed which can operate from cryogenic to very high temperature and nuclear radiation conditions. As indicated above, the concepts of the present invention may also be used with other types of transducers such as accelerometers.

The transducer structures used to measure acceleration or vibration are very similar in concept, as explained below. The acceleration is defined as the rate of change of velocity and an accelerometer measures this rate of change. On the other hand, vibration is defined as the magnitude of displacement and a vibrometer measures this displacement. The present invention is directed to a transducer such as an accelerometer or vibrometer which operates by suspending a mass with a resilient suspension system. When the suspension system accelerates or vibrates at a frequency which is different from the resonant frequency of the suspension system, the mass is deflected from a neutral position. When it is desired to measure acceleration, the resonant frequency of the suspension system is designed to be considerably higher than the frequency of the motion. Therefore, the mass is displaced relative to the suspension system by a distance which is proportional to the acceleration. When it is desired to measure vibratory displacement, the resonant frequency of the suspension system is designed to be considerably lower than the frequency of the vibration. The mass then tends to remain stationary while the suspension system moves about the mass. Therefore, the movement of the suspension system relative to the mass is proportional to the magnitude of the vibration.

The actual output measurement of acceleration or vibratory displacement is achieved through the use of a pair of inductive windings to produce differential output signals. The suspended mass is generally a magnetic core and the magnetic core is suspended in a central position so that an output signal from the inductive windings is zero when the mass is in the central position. Displacement of the magnetic core relative to the inductive windings produces the difference signal from the inductive windings which is representative of the quantity to be measured.

Several problems are inherent in a transducer structure for an accelerometer or vibrometer as disclosed above. The resonant frequency of the suspension system provides an unwanted output component which may intrude into the frequency range at which measurements of acceleration or vibration are being taken. It is therefore desirable to eliminate as much as possible the effects of the natural resonance of the suspension system. The elimination of the effects of the natural resonance is accomplished through a damping of the suspension system. In this way the effects of the resonance of the suspension system may be reduced to a minimum level.

In addition, it is desirable that the damping of the suspension system be constant for a wide range of temperature conditions so that a change in temperature will not bring about a change in the output signal due to a difference in the damping of the suspension system. Reference is made to my copending application Ser. No. 344,453, filed Feb. 12, 1964 (now abandoned), for an "Accelerometer" wherein a transducer is disclosed which provides a constant damping of the suspension system over a wide range of temperatures. The present invention also provides a constant damping of the suspension system over a wide range of temperature conditions.

The output signal from a transducer such as an accelerometer or vibrometer is also affected directly by temperature changes. These changes in the output signal due to temperature changes may occur for various reasons. For example, the physical placement of the magnetic core relative to the inductive windings is affected by the thermal coefficient of expansion of the different materials used in the transducer, and the output signal from the transducer for the same acceleration or vibration is different at different temperatures in accordance with this thermal coefficient of expansion. Also the electrical resistance of the windings varies in accordance with temperature.

The output signal from the transducer is also sensitive to changes in the eddy current loss. The eddy current loss is affected by changes in the impedance of the coils, changes in electrical resistivity of the materials and changes in depth of eddy current penetration. All of the above are affected by temperature. In addition, the magnetic properties of the core materials vary in accordance with the temperature. Finally, in a transducer such as a transducer of the present invention wherein a resilient suspension system is used, the temperature affects the modulus of elasticity of the suspension system.

Various techniques are used to compensate for temperature in transducers such as the transducer of the present invention. For example, reference is again made to my copending application Ser. No. 344,453 (now abandoned) filed Feb. 12, 1964, for some of the various techniques which are used to provide temperature compensation. Most of the various techniques in the past are concerned with using materials which are either complementary in nature or temperature stable so as to povide for an over-all temperature stability.

An additional problem is that even through the transducers of the prior art have been temperature compensated over a particular range of temperatures, instabilities were still present in the transducer structure due to the mechanical strains that were introduced into the transducer during the construction of the transducer. The mechanical strains lead again to a temperature instability in the transducer due to the uncertain nature of the effect of the strain on the output signal from the transducer.

Techniques have been developed to provide methods of neutralizing such strain and reference is made to the copending application of Howard Pitt and Marshall Cantor, Ser. No. 471,080, filed July 12, 1965, which is assigned to the assignee of the instant application.

As transducers such as accelerometers and vibrometers are used to provide measurements under environmental conditions having greater temperature ranges and under more severe nuclear radiation conditions, the prior art methods of temperature compensation as described above become increasingly inadequate. Although the temperature compensation to be accomplished is of a fairly slight degree, it is an increasing battle to both increase the temperature range and to maintain or improve the accuracy of the transducer.

For example, the use of transducers to measure acceleration and vibration in areas which are exposed to high nuclear radiation and temperature is becoming increasingly important. The older types of transducers are completely inadequate since the radiation and temperature produce extreme deteriorations of the transducers. The transducer of the present invention, however, is constructed throughout of ceramic material and various metals so that no organic materials are present to be affected by the radiation. The transducer of the present invention is also temperature stabilized in the manner described in the copending Pitt and Cantor application. In addition, methods of temperature compensation as described in my copending application listed above are also used.

The present invention provides for an additional compensation so as to produce a transducer such as an accelerometer or vibrometer which is capable of being operated over an extremely wide temperature range and which has high temperature stability. Specifically, the present invention provides for a transducer such as an accelerometer or vibrometer having variable damping means to compensate for changes in the modulus of elasticity of the suspension system with changes in temperature. The transducer of the present invention incorporates a gas having a composition and under a particular pressure within a sealed chamber containing the suspension system so as to provide the temperature compensation. The gas essentially has a variable viscosity in accordance with temperature which compensates for the change in modulus of elasticity of the suspension system over a broad range of temperatures. In addition to the above, the transducer of the present invention provides for a constant damping of the suspension system over the range of temperatures at which the transducer is used. A clearer understanding of the invention will be had with reference to the drawings wherein:

FIGURE 1 is a general electrical schematic of a transducer of the present invention; and FIGURE 2 is a detailed cross-sectional view of a vibrometer constructed in accordance with the present invention.

In FIGURE 1 an electrical schematic of a transducer is shown which incorporates a pair of windings 10 and 12 connected in series. Output terminals 14, 16 and 18 are provided so as to provide an output signal. A magnetic core 20 moves relative to the coils 10 and 12. It can be seen that when the core 20 is centered between windings 10 and 12, the output between terminals 14 and 16 is equal to the output between the terminals 16 and 18. Therefore, the difference signal from the windings 10 and 12 would be zero when the core 20 is in the central position. When, however, the core moves from the central position, the outputs from the coils 10 and 12 are now unequal and a different signal may be produced which is in representation of the movement of the core 20.

In FIGURE 2 a detailed cross-sectional view of a vibrometer constructed in accordance with the present invention is shown. The vibrometer of FIGURE 2 includes the coils 10 and 12 and the core 20. An output terminal 16 provides for the common connection between the coils 10 and 12. It is to be appreciated that additional terminals would be present on the transducer structure of FIGURE 2 as shown by the terminals 14 and 18 of FIGURE 1 and that terminal 16 in FIGURE 2 is representative of the additional transducer structures.

The transducer of FIGURE 2 includes a bobbin 22 which has an upstanding central flange 24 and outer flanges 26 and 28. The coils 10 and 12 are wound on the bobbin 22 with the coil 10 wound on the bobbin 22 between the flanges 24 and 26 and with the coil 12 wound on the bobbin between the flanges 24 and 28. The bobbin 22 and coils 10 and 12 are all contained within an outer housing composed of two sections 30 and 32. Housing section 30 includes an internally disposed flange 34 which receives the flange portion 28 of the bobbin 22. A screw 36 may be used to connect the flange 28 and the flange 34 together.

The housing section 30 and the housing section 32 are welded together as shown by circumferentially extending weld 38. A ring member 40 fits within the housing section 32 and provides support for the flange portion 26 of the bobbin 22. A screw 42 may be used to provide a connection between the flange 26 and the ring member 40.

A pair of end members 44 and 46 seal off the ends of the transducer. End member 44 extends across the housing section 32 and is welded as shown by the circular weld 48. End member 46 extends across the housing section 30 and is welded as shown by the circular weld 50. The inner surface of the bobbin 22 and the inside surface of the end members 44 and 46 define a cylindrical chamber 52 internally of the transducer. Disposed within the chamber 52 is the core 20 and a suspension system including a pair of spring coils 54 and 56. The springs 54 and 56 are each attached at one end to the core 20 and pass through tubular members 58 and 60 disposed in the end members 44 and 46. The tubular members 58 and 60 and the springs 54 and 56 are welded at positions 62 and 64 so as to seal the chamber 52. An opening 66 is additionally provided in the end member 46 and a valve structure 68 is disposed in the opening 66 so as to provide a communication to the chamber 52 when desired while normally maintaining the sealed condition within the chamber 52.

The output terminal 16 is insulated from the housing 30 with a ceramic bead 70 and it is noted that the coils 10 and 12 are sealed from the atmosphere. The connection between the coils 10 and 12 is attached to the output terminal 16 through a wire 72 which is electrically attached to a tube 74 which is in communication with and at right angles to the output terminal 16. The use of the tube 74 facilitates the connection of the wire 72 to the output terminal 16. It is to be appreciated that an additional pair of such output terminals would be provided so that the transducer of FIGURE 2 has three output terminals as shown in the schematic of FIGURE 1. Finally, an outwardly extending flange 76 extends from the housing 30 so as to provide a means of attaching the transducer of FIGURE 2 to the specimen to be tested for vibration.

The transducer of FIGURE 2 includes materials which are designed to operate over cryogenic to high temperature ranges and under severe nuclear radiation conditions. For example, the various metal parts of the transducer such as the bobbin 22, housing sections 30 and 32, end members 44 and 46, springs 54 and 56, and other metal parts are constructed of stainless steel. The coils 10 an 12 are constructed of aluminum which is coated with a ceramic insultating material which does not deteriorate under high temperature and nuclear radiation conditions. In addition, the output terminal 16 is insulated by an insulator 70 which is again constructed of a ceramic material which can withstand high temperature and nuclear radiation ranges.

The construction of the transducer of FIGURE 2 is in accordance with known methods of temperature compensation as described earlier and also with reference to my copending application. In addition, each time a weld is made in the transducer of FIGURE 2, the transducer is temperature cycled in accordance with the methods described in the copending Pitt and Cantor application. Finally, the invention provides for an additional compensation to correct for changes in the modulus of elasticity with changes in temperature of the suspension system incorporating the springs 54 and 56.

The present invention includes the use of a gas within the chamber 52 so as to provide for the compensation. The gas within the chamber 52 acts as a damping force on the springs 54 and 56. The gas within the chamber 52 damps the springs 54 and 56 so as to provide for an increased frequency range of operation of the transducer of FIGURE 2 by minimizing the effect of the natural resonance of the suspension system on the output signal from the transducer of FIGURE 2. The damping of the suspension system occurs due to an alternate compression and rarification of the gas in two communication compartments of the chamber 52. Specifically, the chamber 52 includes a first compartment 78 and a second compartment 80. A cylindrical passageway 82 between the core 20 and the inside surface of the bobbin 22 communicates between the compartments 78 and 80. As the gas is compressed first in the compartment 78 the passageway 82 permits some of the gas to escape to the compartment 80. My copending application describes means for varying the size of the passageway 82 so as to provide for a constant damping of the suspension system with changes in temperature. The passageway 82 is varied by using materials for the core 20 and the bobbin 22 having coefficients of expansion so as to provide a change in the size of the passageway 82 which counteracts changes in the damping due to changes in temperature.

The present invention provides for an additional compensation through the use of a gas in the chamber 52 having a particular composition and under a particular pressure so as to provide for a change in the viscosity of the gas with changes in temperature which counteract the change in the modulus of elasticity of the suspension system which includes the springs 54 and 56. The present invention provides a transducer such as a vibrometer which is very accurately temperature compensated for temperatures from cryogenic to 1200° Fahrenheit.

The present invention may use various gases or combinations of gases such as helium, argon and nitrogen to provide the particular composition of the gas within the chamber 52. In addition, the gas may be placed in the chamber 52 at a pressure either above or below atmospheric pressure so as to provide the proper compensation. In addition to the provision of the compensation for the changes in the modulus of elasticity of the suspension system due to the changes in temperature, the present invention also provides a quick and easy means of changing the temperature range over which a transducer is compensated. The change in the temperature compensated range of temperatures is accomplished through the use of a change in the composition and/or pressure of the gas within the chamber 52. A quick change of the composition and/or pressure of the gas within the chamber 52 is accomplished by using the valve structure which provides a communication into the chamber 52. The present invention, therefore, provides a means of quickly changing the temperature range of compensation of a transducer such as an accelerometer or vibrometer.

The present invention may, therefore, be thought of as a transducer having high temperature stability, having improved temperature compensation including temperature compensation for changes in the modulus of elasticity of the suspension system and having means for providing a change in the temperature range of temperature compensation of the transducer. The present invention provides for the improved temperature compensation and quick change in range of temperature compensation by the use of a damping gas in an internal chamber of a transducer which includes a suspension system and wherein the damping gas has a composition and a pressure to provide a change in viscosity of the gas with temperature to compensate for the change in the modulus of elasticity of the suspension system with temperature.

It is to be appreciated that the present invention has been described with reference to a particular embodiment of a vibrometer. However, it is to be appreciated that the present invention may be used with other types of transducers such as accelerometers or pressure transducers. The present invention, therefore, is subject to many adaptations and modifications and is only to be limited by the appended claims.

What is claimed is:

1. A transducer for providing an output signal in response to a relative movement between a magnetic core and an inductive winding, including
   a bobbin including a central opening and means sealing the ends of the central opening to form a central chamber,
   at least one inductive winding wound on the bobbin,
   a magnetic core disposed within the central chamber of the bobbin,
   a suspension system disposed within the central chamber of the bobbin and coupled to the magnetic core for supporting the magnetic core for movement relative to the bobbin, and
   a gas having a particular composition and disposed within the central chamber under pressure and having changes in viscosity with changes in temperature to provide temperature compensation in the transducer over a particular range of temperatures.

2. The transducer of claim 1 additionally including means operatively coupled to the central chamber for changing the gas in the central chamber to vary the range of temperature composition.

3. The transducer of claim 1 wherein the gas provides a constant damping of the suspension system over the particular range of temperatures.

4. A transducer for providing an output signal in response to a relative movement between a magnetic core and an inductive winding, including
   an outer cylindrical support member including a cylindrical central opening and having means sealing the ends of the central opening to form a chamber,
   at least one inductive winding wound on the outer surface of the support member,
   a magnetic core disposed within the chamber of the support member,
   a spring suspension system disposed within the chamber of the support member and coupled to the magnetic core for supporting the magnetic core for vibratory movement relative to the support member and having changes in elasticity with changes in temperature, and
   a gas having a particular composition and disposed within the chamber under pressure and damping the spring suspension system to a critical damping and having changes in viscosity with changes in temperature to provide compensation for changes in elasticity of the spring suspension system with changes in temperature over a particular range of temperatures.

5. The transducer of clam 4 additionally including means operatively coupled to the chamber for changing the gas in the chamber to vary the range of temperature compensation.

6. The transducer of claim 4 wherein the cylindrical support member and the magnetic core are spaced from each other by a particular distance and wherein changes in temperature provide changes in the spacing between the magnetic core and the cylindrical support member for maintaining the critical damping at a constant value over the particular range of temperatures.

7. A transducer for providing an output signal in response to a relative movement between a magnetic core and an inductive winding, including a bobbin including a central opening and having means sealing the ends of the central opening to form a central chamber, at least one inductive winding wound on the bobbin, a magnetic core disposed within the central chamber of the bobbin, a double spring suspension system disposed at opposite ends of the central chamber of the bobbin for supporting the magnetic core between the springs for vibratory movement relative to the bobbin to produce an output signal from the inductive winding in accordance with the relative vibratory movement, and a gas having a particular composition and disposed within the central chamber under pressure and cooperating with the double spring suspension system to provide an overall elasticity and having changes in viscosity with changes in temperature to provide temperature compensation in the transducer over a particular range of temperatures.

8. The transducer of claim 7 additionally including a valve extending into the chamber for changing the gas in the chamber to vary the range of temperature compensation

9. The transducer of claim 7 wherein the magnetic core is spaced from the inner surface of the central chamber and wherein the spacing varies to provide a constant elasticity over the particular range of temperatures.

References Cited
UNITED STATES PATENTS

| | | |
|---|---|---|
| 2,958,137 | 11/1960 | Mueller. |
| 3,100,292 | 8/1963 | Warner et al. |
| 3,153,346 | 10/1964 | Quirmbach _____73—497 |
| 3,190,128 | 6/1965 | Weir. |

MILTON O. HIRSHFIELD, *Primary Examiner.*

D. F. DUGGAN, *Assistant Examiner.*